Dec. 6, 1966   D. SCARAMUCCI   3,289,693
CHECK VALVE
Filed Feb. 10, 1964   3 Sheets-Sheet 1

INVENTOR.
DOMER SCARAMUCCI
BY
Dunlap & Laney
ATTORNEYS

INVENTOR.
DOMER SCARAMUCCI
BY
Dunlap & Laney
ATTORNEYS

Dec. 6, 1966     D. SCARAMUCCI     3,289,693

CHECK VALVE

Filed Feb. 10, 1964     3 Sheets-Sheet 3

INVENTOR.
DOMER SCARAMUCCI

BY
Dunlap & Laney
ATTORNEYS

United States Patent Office 3,289,693
Patented Dec. 6, 1966

3,289,693
CHECK VALVE
Domer Scaramucci, 3245 S. Hattie, Oklahoma City, Okla.
Filed Feb. 10, 1964, Ser. No. 343,518
10 Claims. (Cl. 137—525.3)

This invention relates generally to flow control devices. More particularly, but not by way of limitation, this invention relates to valves useful in fluid systems to prevent fluid flow in one direction while permitting flow therethrough in the opposite direction.

Check valves manufactured in the past utilizing resilient hinges have been of such construction that the resilient hinge was simply bent when the flapper was rotated to open the valve. Such valves depend upon the mass of the hinge and the reverse flow to provide force sufficient to close the valve. While generally satisfactory results were obtained with this type of construction, more efficient closure of the valve resulted when the hinge was above the flapper so that gravity aided in the closure thereof.

In some applications the check valve must be mounted in such a position that the flapper must swing against the force of gravity. Most check valves previously manufactured for this type of application utilize spring loaded flappers so that the valve is returned positively regardless of the position. Such valves are generally unsuitable in applications involving the handling of corrosive or erosive materials. Corrosive materials attack the springs made of common spring materials, rapidly deteriorating them and resulting in complete valve failure. Spring materials resistant to the corrosive materials being handled are extremely costly so that the price of a valve so equipped could not be competitive with normal check valves. Also, erosive materials, such as small solids, abrade the springs and thereby weaken them. Furthermore, solids become lodged in the relatively small spaces between the moving parts, such as between the hinge pin and spring, resulting in the valve becoming stuck.

Another problem that occurred was the lack of consistency in the spring force available between the various springs produced. This inconsistency occurred even between springs manufactured in the same lot. One method proposed to overcome this problem was to provide a rotatable hinge pin to adjust the load on the spring. While this has helped to compensate for spring inconsistency, it has not reduced the corrosion and erosion problems.

As constructed in the past, check valves having resilient hinges have had a relatively short service life due to failure of the hinge. Such failures occur because of the constant reversal of bending stresses which are placed on the hinge during the opening and closing of the valve. The effect of the reversal of bending stresses on the hinge could be alleviated or perhaps even eliminated by extending the length of the hinge in a direction perpendicular to the axis of bending whereby such stresses are distributed over a larger hinge area. Generally, the space conditions within a check valve are so limited that the length of the hinge cannot be extended sufficiently to provide any practical advantage. In view of the space limitations within the valve, most of the resilient hinges constructed in the past have effectively lengthened the hinge by grooving or otherwise reducing the thickness of the hinge along the pivotal axis. While the reduction in the hinge thickness in this manner has prolonged the life of the check valve to some extent, it has not eliminated the bending stresses placed on the hinge and is therefore not entirely satisfactory.

It should also be apparent that check valves incorporating the multiplicity of parts necessary to spring load the valve also increased the cost of the valve. Due to the competition between valve manufacturers, it is very important that a valve of this type be produced which will be competitive with the price of other check valves.

This invention contemplates a check valve which includes a generally tubular valve body with inlet and outlet ends adapted to be connected in a fluid handling system. A planar seat extends across the body and has an opening or aperture therein to provide for fluid flow through the valve. A valve member is mounted on the outlet side of the planar seat and has a mounting member for attaching the valve member to the seat, a flapper adapted to cover the aperture, a pair of suspension members extending from the flapper in spaced relation with the mounting member, and a pair of resilient connecting members joining the flapper and mounting member. The arrangement is such that rotation of the flapper relative to the mounting member imparts a torsional restoring force to the connecting member whereby the flapper will be returned to sealing engagement with the seat.

An object of the invention is to provide an improved check valve which incorporates a hinge structure which permits relative rotational movement between a flapper and the valve seat, and wherein such movement is absorbed in the hinge as a torsional deformation.

One other object of the invention is to provide an improved check valve which incorporates structure for exerting a torsional closing force on the flapper, but is less subject to corrosion and erosion than check valves previously manufactured.

Another object of the invention is to provide an improved check valve which incorporates a hinge structure that is not subject to sticking due to the interference of small solids carried in the fluid handling system.

A further object of the invention is to provide an improved check valve incorporating a valve member which may be molded or cast in one molding operation.

Still another object of the invention is to provide an improved check valve incorporating a resilient hinge means that will close regardless of the orientation of the valve in the fluid system.

A still further object of the invention is to provide an improved check valve which can be easily and economically manufactured.

Other and further objects and advantages of the invention will become more apparent when the following description is read in conjunction with the accompanying drawing wherein like reference characters denote like parts in all views and wherein.

Figure 1:
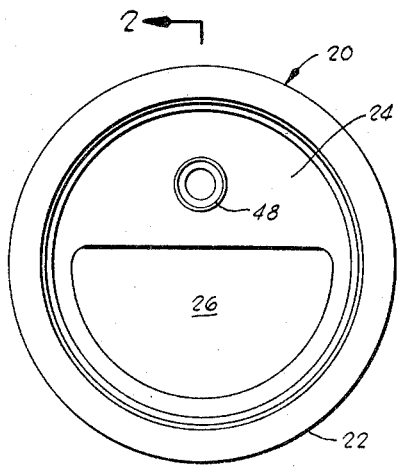
FIG. 1 is an end view of a check valve constructed in accordance with the invention.
Figure 2:
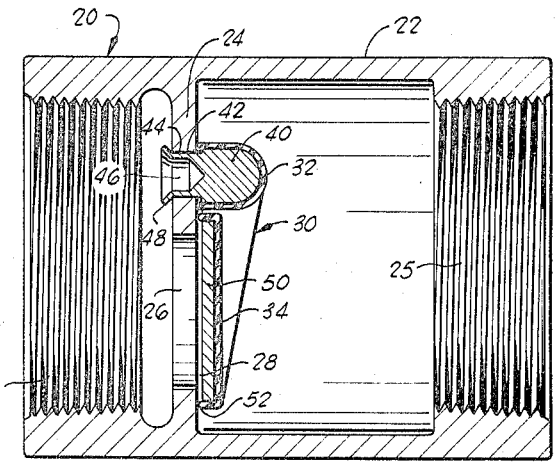
FIG. 2 is a cross-sectional view of the valve of FIG. 1 taken along the line 2—2.

Referring now to the drawings, and to FIGS. 1 and 2 in particular, shown therein and generally designated by the reference character 20 is a check valve constructed in accordance with the invention. The check valve 20 includes a valve body 22 having an inlet end 23 and an outlet end 25. As illustrated, the inlet and outlet ends 23 and 25, respectively, are provided with threads for attaching the check valve to sections of a conduit (not shown). The ends may be provided with other means of attaching the check valve compatable with the sections of conduit to which it may be attached, such as flanges or sleeves.

The valve body 22 includes a generally planar seat 24 which extends transversely across the interior of the valve body 22. The planar seat 24 is provided with an opening or aperture 26 which in the illustrated embodiment has a shape resembling a "D." The planar seat 24 has a surface 28 on the outlet side thereof which generally encircles the aperture 26.

Figures 5, 6, 7:
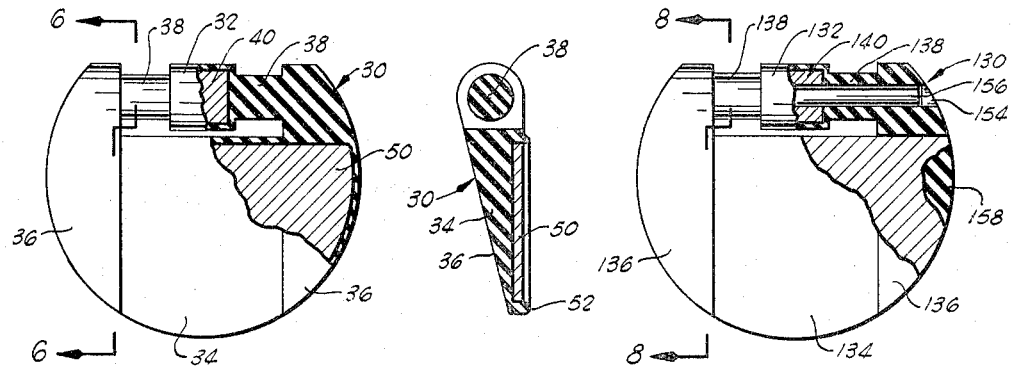
FIG. 5 is a view, partly in cross-section, of a valve member which may be utilized in a check valve constructed in accordance with the invention.
FIG. 6 is a cross-sectional view of the valve member of FIG. 5 taken along a line 6—6.
FIG. 7 is a view similar to FIG. 5 showing a variation in the construction thereof.

The check valve 20 also includes a valve member 30, which is more clearly shown in FIG. 2. The valve member 30 includes a mounting member 32 and a flapper member 34. As best shown in FIG. 5, the valve member 30 also includes a pair of relatively rigid flapper suspension members 36 which extend from the flapper member 34 in spaced relation with the mounting member 32. Connecting members 38 are provided and extend between the suspension members 36 and the mounting member 32 axially along the axis of rotation of the flapper member 34 to pivotally attach the flapper member 34 to the mounting member 32.

The connecting members 38 are preferably composed of a resilient material such as rubber, synthetic rubber, or plastic composition. In the valve member 30, the connecting members 38 are of a solid, cylindrical form as shown in FIG. 6. The space between the mounting member 32 and each of the suspension members 36 (which is the extent of the connecting members 38) should be sufficient to permit the rotation of the flapper member 34 with respect to the mounting member 32 in an arc of at least 90 degrees. In other words, the connecting members 38 should be of such length that the 90-degree rotation of the flapper member 34 can be absorbed therein as a torsional distortion without shearing the connecting members 38.

The mounting member 32 includes a reinforcing member 40 which has one end thereof reduced in diameter, as at 42 (FIG. 4), so that the mounting member 32 can be inserted through a hole 44 in the planar seat 24 to retain the valve member 30 in the check valve 20. As shown in FIG. 2, the reduced end 42 of the mounting member 32 is also provided with an interior bore 46, such that the reinforcing member 40, when inserted through the hole 44 can be deformed, as at 48, to retain the mounting member 32 in the valve body 22. It should be understood that other means can be provided for retaining the valve member 30 in the valve body 22, such as threading the bore 46 in the mounting member 32 and inserting a screw therein.

The flapper member 34 also includes a reinforcing member 50 located therein. The reinforcing member 50 is sized to engage the surface 28 of the planar seat 24 around the aperture 26. In the preferred form of the invention, the mounting member 32 and flapper member 34 are covered by a resilient material. The resilient material extends around the periphery of the reinforcing member 50 and projects therefrom toward the inlet end 23 of the valve body 22, so that a pressure responsive bead 52 formed from the resilient material will engage the surface 28 of the planar seat 24 prior to the engagement of the reinforcing member 50 with the seat 24.

It can be seen from the foregoing description that the valve member 30, which has been previously described, can be very easily molded in one piece by inserting the reinforcing members 40 and 50 in the mold cavity and then introducing the resilient material therein. It should also be pointed out that after removing the valve member from the mold cavity, all that is required to assemble the check valve 20 is the insertion of the reinforcing member 40 into the opening 44 provided in the planar seat 24, and bradding or otherwise fixing the mounting member 32 to the planar seat 24. It will therefore be realized that no external opening is required in the valve for the insertion and mounting of the valve member 30.

Figure 3:
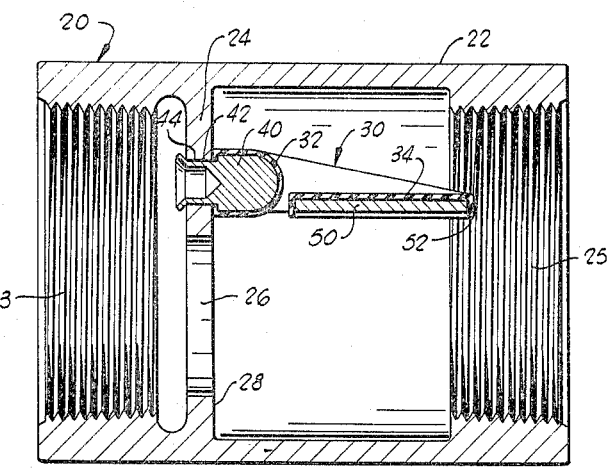
FIG. 3 is a view of a portion of FIG. 2 but showing the flapper in the open position.

The check valve 20 is utilized by connecting sections of a conduit (not shown) with the inlet end 23 and outlet end 25 of the valve body 22. Fluid flowing through the check valve 20 will pass through the aperture 26, causing the flapper member 34 to be rotated about the connecting members 38 to the position shown in FIG. 3. The flapper member 34 will remain in this position so long as the fluid flow through the aperture 26 is adequate to overcome the torsional effect of the connecting members 38. Should the flow cease entirely, or should the differential from the inlet end 23 to the outlet end 25 be insufficient to overcome the torsional force of the connecting members 38, the flapper member 34 will return to the position shown in FIG. 1. In this position, the pressure responsive bead 52 is in initial sealing engagement with the surface 28 of the planar seat 24.

Figure 4:
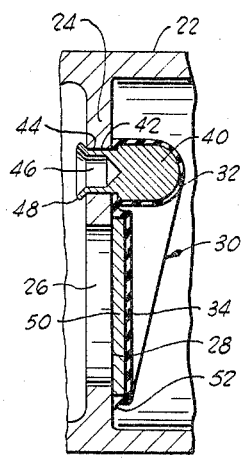
FIG. 4 is a view similar to FIG. 3, but showing the valve in a sealed position.

An increase in differential pressure from the outlet end 25 to the inlet end 23 will cause the flapper member 34 to move to the position shown in FIG. 4. In this position, it can be seen that the reinforcing member 50 has engaged the surface 28 of the planar seat 24 and that the pressure responsive bead 52 has been deformed. As shown therein, the bead 52 is trapped due to the engagement of the reinforcing member 50 with the surface 28 so that additional pressure applied to the flapper member 34 will augment the mechanical seal formed by the bead 52 with the surface 28. Due to the entrapment of the bead 52, it can be appreciated that the bead 52 cannot be extruded or otherwise damaged due to increases in pressure. It should be apparent that so long as the structural limits of the valve 20 are not exceeded, the seal formed by the pressure responsive bead 52 will be effective to prevent flow from the outlet end 25 to the inlet end 23 of the check valve 20.

In forming the valve member 30, the flapper member 34 and mounting member 32 will be arranged at a slightly acute angle so that a slight amount of bias will be exerted on the flapper member 34 when the valve member 30 is mounted in the valve body 22. When the flapper member 34 moves to the position shown in FIG. 3, the rotation thereof causes a torsional or twisting movement in the connecting member 38, thereby storing in the connecting member 38 a torsional or biasing force which will restore the flapper member 34 to its original position in the event that flow should cease.

Figures 8, 9, 10:
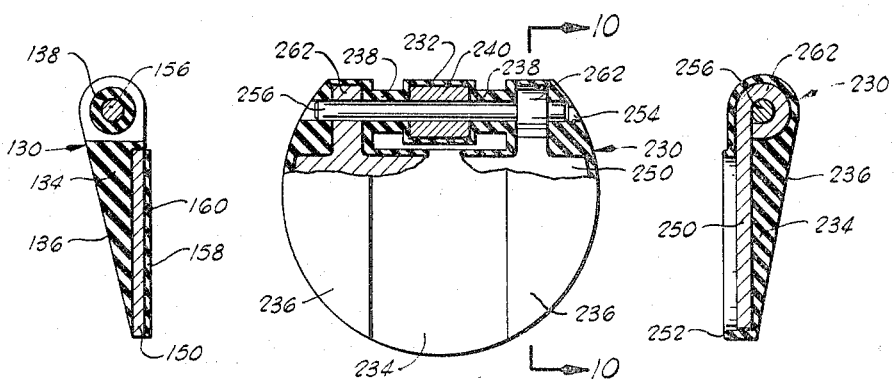
FIG. 8 is a cross-sectional view of the valve member of FIG. 7 taken along the line 8—8.
FIG. 9 is a view, partly in cross-section, of a valve member also constructed in accordance with the invention and illustrating another variation in the structure thereof.
FIG. 10 is a cross-sectional view of the valve member of FIG. 9 taken along the line 10—10.

An alternate form of valve member 130 is shown in FIGS. 7 and 8. The valve member 130 may be utilized in the check valve 20. As illustrated, the valve member 130 differs primarily in the formation of the hinge portion which includes the connecting members 138, the mounting member 132 and the suspension members 136. The valve member 130 also illustrates a slightly different form of seal from the pressure responsive bead 52 shown in connection with the valve member 30. The valve member 130 includes a mounting member 132, a flapper member 134, a pair of relatively rigid flapper suspension members 136 which extend from the flapper member 134 in spaced relation with the mounting member 132. Connecting members 138 join the flapper suspension members 136 with the mounting member 132 along the axis of rotation of the flapper member 134 to provide for rotation of the flapper member 134 relative to the mounting member 132. An opening 154 extends through the suspension members 136, the connecting members 138 and the mounting member 132 to provide for the insertion of a pin 156. In the molding operation wherein the valve member 130 is formed, a separate pin will be inserted in the mold and then replaced by the pin 156. The pin 156 will be of slightly smaller diameter than the molding pin so that as little frictional interference as possible will be induced by the hinge pin 156. A layer of resilient material 158 will be molded over the surface 160 of the reinforcing member 150 which is located in the flapper member 134. The purpose of the resilient material 158 is to form a seal with the surface 28 of the planar seat 24 when the valve member 130 is mounted in the check valve 20.

It can be seen that the operation of the valve member 130, when mounted in the check valve 20, will be essentially the same as the operation of valve member 30. The opening 154 in the valve member 130 will reduce the torsional restoring force available from the connecting members 138 by an insignificant amount. The opening 154 will permit the insertion of the hinge pin 156 to provide additional strength to the valve member 130 to prevent a tendency of the flapper member 134 to cock relative to the mounting member 132. It should be realized that when the flapper member 134 assumes the position similar to that shown in FIG. 3 for the valve member 30, the torsional force will be stored in the connecting members 138 which will restore the flapper member 134 to the position of the flapper member shown in FIG. 1. The seal formed by the resilient material 158 with the surface 28 of the planar seat 24 will not be as effective at low pressures as the pressure responsive bead 52, but has been shown to illustrate that any form of seal may be utilized in connection with the valve member 130.

Another form of valve member is designated by the reference character 230 and is shown in FIGS. 9 and 10. As shown therein, the valve member 230 includes a mounting member 232, a flapper member 234, a pair of flapper suspension members 236 extending in spaced relation with the mounting member 232, and a pair of connecting members 238 joining the flapper suspension members 236 with the mounting member 232. The valve member 230 also includes a hinge pin 256 positioned in an opening 254 which extends through the mounting member 232, the connecting members 238 and the flapper suspension members 236.

As illustrated, a reinforcing member 250, similar to the reinforcing member 50, is positioned in the flapper member 234. The reinforcing member 250 also includes a pair of extensions 262 thereon which are formed to encompass a portion of the hinge pin 256. The extensions 262 of the reinforcing member 250 provide sufficient rigidity to the valve member 230 so that the valve suspension members 236 do not need to be as thick as shown in FIG. 10. If desired, the resilient material covering the reinforcing member 250 can be reduced to the minimum thickness. As clearly shown in FIG. 10, the valve member 230 also includes a pressure responsive bead 252 formed from resilient material which extends generally around the periphery of the reinforcing member 250. The pressure responsive bead 252 also extends across the extensions 262 of the reinforcing member 250 so that a continuous bead having a shape similar to the bead 52 of FIG. 1 is provided.

As was true with the valve member 130 of FIGS. 7 and 8, the valve member 230 will also be formed using a pin in the molding process of larger diameter than the hinge pin 256 ultimately used during the operation of the valve member 230.

With the valve member 230 installed in the valve body 22 of the check valve 20, the flapper member 234, with no fluid flow, will assume the same position as the flapper member illustrated in FIG. 2. With fluid flowing through the aperture 26 from the inlet end 23, the flapper member 234 will rotate about the hinge pin 256 to the position shown in FIG. 3. The rotation of the flapper member 234 with respect to the mounting member 232 will induce a torsional force in the connecting members 238 so that the flapper member 234 will be restored to the sealing position upon the cessation of flow through the aperture 26. The pressure responsive bead 252 will form a seal at very low pressures with the surface 28 of the planar seat 24, as described with respect to the valve member 30. As was true with the valve member 30, increases in differential pressure from the outlet end 25 to the inlet end 23 will cause the reinforcing member 250 to move into engagement with the surface 28, deforming the pressure responsive seal 252 outwardly. Further increases in differential pressure will augment the seal formed thereby.

Figure 11:
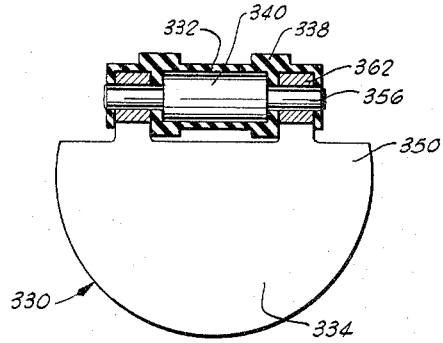
FIG. 11 is a partial view of a valve member, illustrating another variation in the structure thereof.

In some instances, for example in relatively small valves, it may be necessary that the length of the connecting members joining the flapper and mounting member be extremely small. It has been found that the same resilient hinging action may be attained in such valves by the utilization of a structure such as shown in FIG. 11. As shown therein, a mounting member 332 with its reinforcing member 340 will be placed closely adjacent an extension 362 of a reinforcing member 350. The reinforcing member 350 will be formed very similarly to the reinforcing member 250 of FIG. 9. A pin 356 extends through the extension 362 of the reinforcing member 340 of the mounting member 332.

If connecting members 338 were formed as they were in the other valve members illustrated, it will readily be appreciated that the proximity of the extension 362 of the reinforcing member 350 with the reinforcing member 340 of the mounting member 332 would simply shear the resilient connecting members 338 upon rotation of the flapper member 334. Any possible torsional effect of the connecting members 338 would be destroyed. However, as shown in FIG. 11, the connecting members 338 have been enlarged relative to the size of the mounting member 332 and the extension 362 so that the shearing action therebetween may occur but with the provision of sufficient material so that the entire connecting members 338 will not be sheared. Sufficient material is provided so that a portion around the periphery of the connecting members 338 will not shear and will provide the desired torsional action to return the flapper member 334 to its original position. Naturally, the resilient material forming the connecting members 338 need not be increased in diameter only at the points of stress as illustrated, but may be extended across the entire hinge portion of the valve member 330.

Figure 13:
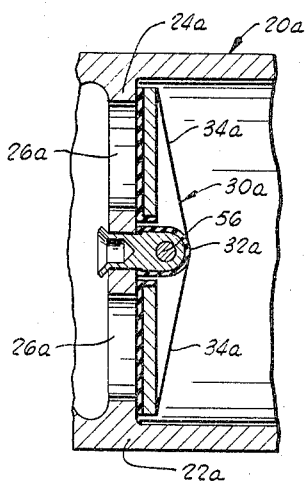
FIG. 13 is a cross-sectional view of the valve of FIG. 12 taken along the line 13—13; and, FIG. 14 is an elevation view, partly in cross-section, of the valve member of FIG. 13.
Figure 14:
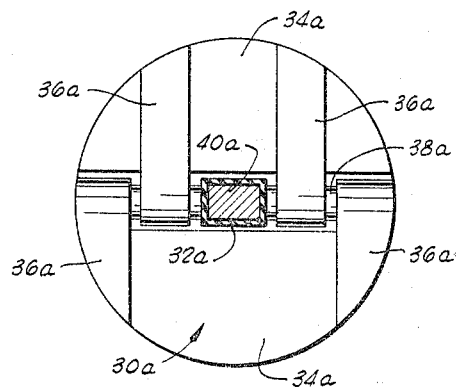

FIGS. 13 and 14 are shown to illustrate the application of the foregoing described hinge arrangements to a dual flapper type valve. As shown therein, a check valve 20a includes a generally tubular valve body 22a and a planar seat 24a extending thereacross. Apertures 26a extend through the planar seat 24a to provide for fluid flow through the check valve 20a. A valve member 30a is mounted on the planar seat 24a by means of a mounting member 32a similar to the mounting member 32 of FIG. 2. The valve member 30a, in addition to the mounting member 32a, includes a pair of flapper members 34a. Each of the flapper members 34a has a pair of flapper suspension members 36a (FIG. 14) extending therefrom in spaced relation with the mounting member 32a. Connecting members 38a join the suspension members 36a and the mounting member 32a in such a manner as to provide the torsional restoring force to the flapper members 34a. As shown in FIG. 13, a hinge pin 56 extends entirely through the valve member 30a to prevent cocking of either of the flapper members 34a relative to the mounting member 32a.

With fluid flowing through the check valve 20a and the apertures 26a, flapper members 34a will be rotated about the connecting members 38a. Each flapper member 34a will be rotated approximately 90 degrees. It can be seen that a 90 degree rotation of each of the flapper members 34a will induce a twisting or torsion in the connecting members 38a joining the suspension members 36a in approximately 180 degrees relative rotation. It can therefore be appreciated that the resilient material used to form the connecting members 38a needs to have sufficient resiliency to absorb this additional twisting movement.

Figure 12:
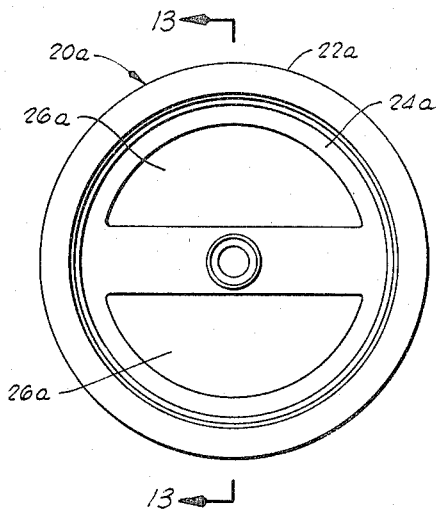
FIG. 12 is an end view of a check valve, also constructed in accordance with the invention, showing a double flapper construction.

Should fluid cease to flow through the apertures 26a, or should a slight differential exist between the outlet and inlet ends of the check valve 20a, the torsional force induced in the connecting members 38a will restore the flapper members 34a to the positions shown in FIG. 13. It will be appreciated that the double flapper arrangement illustrated in FIGS. 12, 13 and 14 is primarily applicable to the larger size valve which may be manufactured. However, should smaller valves be constructed utilizing the double flapper arrangement, the importance of the hinge structure illustrated by FIG. 11 becomes more apparent. Utilization of the hinge structure shown in FIG. 11 permits the connecting members 38a to be foreshortened so that the double flapper arrangement will take less lateral distance in which to incorporate the resilient hinge portion.

From the foregoing, it should be apparent that a check valve constructed in accordance with this invention can be utilized in any position or orientation in a fluid control system and still provide a seal. A check valve constructed in accordance with this invention can be easily and economically manufactured due to the configuration of the valve structure and due to molding the valve member as one piece if desired. It should also be apparent that a valve constructed in this manner will not be subject to sticking because of the interference of solids carried in the fluid. The valve member, constructed as hereinbefore described, eliminates the presence of any bending stresses on the hinge portion connecting the flapper and the mounting portion. The torsional type hinge utilized in the valve member provides for the maximum service life of the valve and yet occupies the minimum of space.

The foregoing embodiments are by way of example and it is understood that many changes and modifications can be made therein without departing from the spirit of the invention or from the scope of the annexed claims.

What I claim is:
1. A check valve including:
a tubular body having inlet and outlet ends;
a generally planar seat extending across said body between said ends;
means forming an aperture extending through said planar seat; and,
a valve member mounted on the outlet side of said planar seat,
said valve member including a flapper member adapted to cover said aperture, a substantially rigid mounting member, a pair of relatively rigid flapper suspension members joined with said flapper member and extending therefrom in spaced apart relation with said mounting member, and resilient connecting means joining each of said suspension members to said mounting member whereby rotation of said flapper member relative to said mounting member imparts a torsional force to said resilient connecting means.

2. The check valve of claim 1, and also including a reinforcing member located in said flapper portion, said reinforcing member being sized to engage a portion of the planar seat surrounding said aperture.

3. The check valve of claim 1, wherein said flapper member, mounting member, flapper suspension members, and connecting means are formed from a mass of resilient material.

4. The check valve of claim 3, wherein said flapper member includes:
a reinforcing member located therein, said reinforcing member being sized to engage a portion of the planar seat surrounding said aperture; and,
said mounting member includes a reinforcing member located therein and having a portion thereof in engagement with said planar seat whereby said valve member is retained on the outlet side of said seat.

5. The check valve of claim 2 wherein said flapper member also includes a pressure responsive bead portion extending around the periphery of said reinforcing member and projecting past said reinforcing member toward the inlet of said valve body whereby said bead portion will engage said planar seat prior to the engagement thereof by said reinforcing member.

6. A check valve including:
a tubular valve body having inlet and outlet ends;
a generally planar seat extending across said valve body between said ends;
means forming an aperture extending through said planar seat; and,
a valve member mounted on the outlet side of said planar seat,
said valve member including a flapper member having a reinforcing member therein sized to engage a portion of the seat surrounding said aperture, a substantially rigid mounting member fixed to said planar seat, a pair of relatively rigid suspension members joined to said flapper member and extending therefrom in spaced apart relation with said mounting member, resilient, tubular connecting means joined to said suspension members and mounting member, and pin means extending through said mounting member, suspension members, and coaxially through said tubular connecting means.

7. A valve member useful in connection with check valves, said valve member being formed from a resilient material and including:
a mounting member having a reinforcing member located therein;
a flapper member having a pair of relatively rigid suspension members extending therefrom in spaced apart relation with said mounting member;
connecting means joining each of said suspension members with said mounting member, wherey rotation of said flapper member relative to said mounting member imparts a torsional force to said connecting means.

8. The valve member of claim 7 wherein said connecting means is tubular and wherein said valve member also includes:
a pin member extending through said mounting member, suspension members, and coaxially through said connecting means; and,
a substantially rigid reinforcing member located in said flapper member.

9. A valve member including:
a reinforced mounting member;
a flapper member having a pair of relatively rigid suspension members extending therefrom in close spaced relation with said mounting member;
a pin member extending through said mounting member and suspension members; and,
resilient connecting means joining said suspension members and mounting member and encircling said pin member in sufficient thickness whereby said flapper member can be pivoted at least 90° relative to said mounting member without shearing said connecting means.

10. A check valve including:
a tubular valve body having inlet and outlet ends;
a planar seat extending across said valve body between said ends;
means forming an aperture extending through said planar seat; and,
a valve member including a reinforced mounting member for attaching said valve member to the outlet side of said planar seat, said valve member including a flapper member sized to cover said aperture and be pivoted in the valve body toward and away from said planar seat, a mounting member secured to the valve body in alignment with the pivotal axis of the flapper member, and resilient means being extended along the pivotal axis of the flapper member to be placed in torsion upon pivoting of the flapper member away from said planar seat and impose a force on the flapper member urging the flapper member toward said planar seat.

No references cited.

WILLIAM F. O'DEA, *Primary Examiner.*

H. COHN, *Assistant Examiner.*